Oct. 14, 1969  J. V. BOUYOUCOS  3,472,199
ACOUSTIC VIBRATION GENERATORS
Filed July 31, 1967
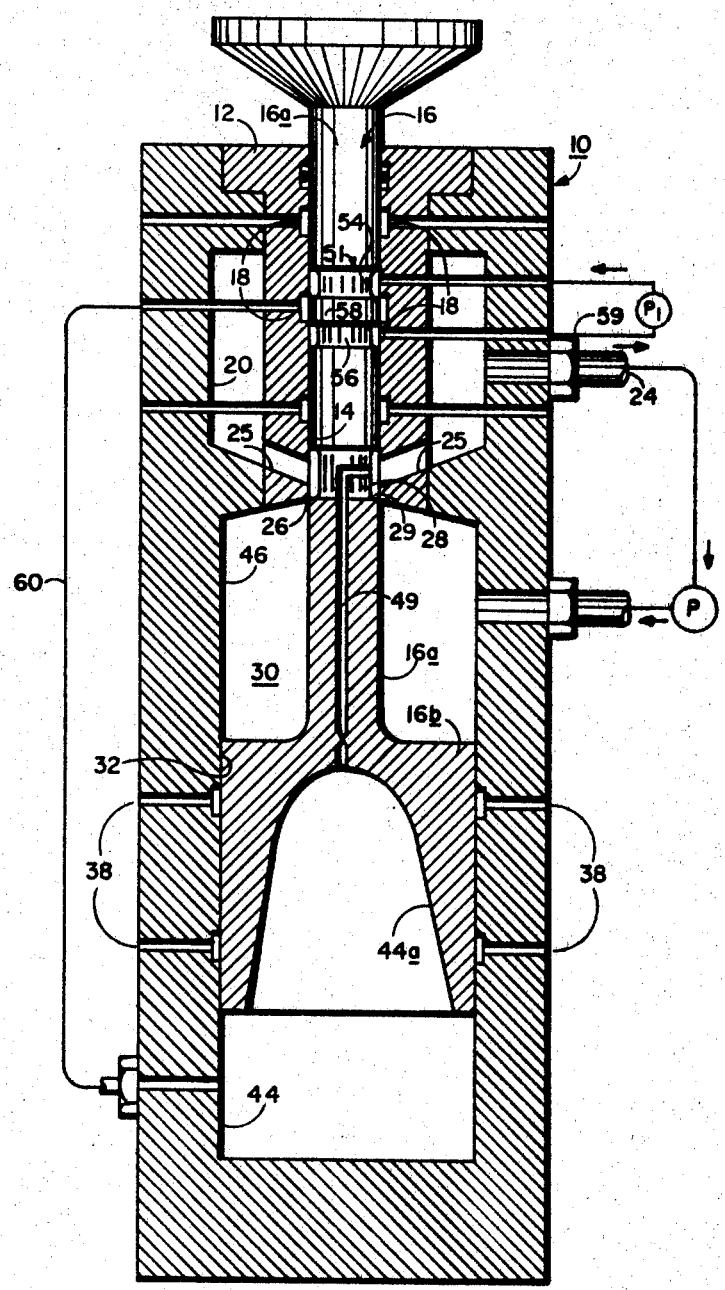
INVENTOR.
JOHN V. BOUYOUCOS

United States Patent Office 3,472,199
Patented Oct. 14, 1969

3,472,199
ACOUSTIC VIBRATION GENERATORS
John V. Bouyoucos, Monroe, N.Y., assignor to General Dynamics Corporation, a corporation of Delaware
Filed July 31, 1967, Ser. No. 657,176
Int. Cl. G10k 9/10
U.S. Cl. 116—137                    5 Claims

ABSTRACT OF THE DISCLOSURE

A high force self-excited hydrocoustic oscillator is described which includes a reciprocating valve member disposed in a housing and embodied in a single-degree-of-freedom oscillatory circuit. At one end, the valve is directly coupled to a load, while at its other end it is provided with piston portion which separates a chamber formed in the housing into upper and lower spring cavities. The oscillator converts pressurized fluid flow through the upper spring cavity into alternating motion of the valve.

---

The present invention relates to acoustic vibration generators.

Heretofore hydroacoustic vibration generators have been found to operate admirably in a number of different applications. However, they are sometimes subject to disadvantages when coupled to large reactive loads found in, for example, applications where a large mass must be vibrated at sonic frequencies.

Accordingly, it is an object of the present invention to provide an improved hydroacoustic oscillator which is especially suitable for driving large reactive loads and which will remain in resonance independent of load variations.

A further object of the present invention is to provide a hydroacoustic oscillator which is configured to provide for efficient power transmission from an oscillator to a load.

Briefly described, an acoustic vibration generator embodying the invention includes a self-excited valve member, which is constrained generally to a single-degree-of-freedom, and is directly coupled at its upper end to a large reactive load. The valve member terminates in a large piston portion disposed in a chamber of the housing. This piston portion is configured to separate this chamber into upper and lower spring cavities. The oscillator converts hydraulic energy into alternating mechanical energy which may be transferred into oscillatory movement of the load, as pressurized fluid intermittently flows from the upper spring cavity through a main discharge orifice into a discharge circuit during a portion of a cycle when the valve member opens the orifice.

The invention itself, both as to its organization and method of operation, as well as additional objects and advantages thereof will become more readily apparent from a reading of the following description in connection with the accompanying drawing which is a longitudinal sectional view of an oscillator constructed in accordance with a preferred embodiment of the invention.

A representative oscillator is shown to include a housing 10 which includes an insert valve guiding member 12. The member 12 is formed with a smooth interior bearing surface 14 which is adapted to guide a cylindrical portion 16a of massive piston valve member 16. The piston valve member 16 is freely supported by a series of hydrostatic bearings 18 (drains for which are not shown to simplify the illustration), which bearings open onto the surface 14 and are coupled to a source of highly pressurized fluid, not shown.

Between the outer cylindrical surface of the guide insert member 12 and the housing 10 there is provided a discharge chamber 20 which is connected to a discharge conduit 24. Located at the lower end of the insert member 12, a series of port orifices 25 extend from the chamber 20 and open onto the surface 14, adjacent to the lower exterior edge 26 of the surface 14. The portion 16a of the valve member 16 is substantially cylindrical and is in a mating or sliding fit relationship with the surface 14. However, near the edge 26 (viz the stator port region) the member 16 is provided with a reduced or cut away portion 28. By means of this arrangement, when the valve member 16 is in its downward position, as shown in the drawing, a flow discharge will take place through the annular orifice 29 which comprises the region between the free edge 26 and the cut away portion 28, whereas when the valve member 16 is in its upward position, the edge 26 will be adjacent to a mating surface of the piston valve member 16 and no fluid will flow.

From the bottom surface insert member 12, the housing is configured to define an enclosed cylindrical chamber 30. Into this chamber, the valve member 16 extends forming a large piston portion 16b. The outer cylindrical surface 32 of the portion mates with the interior surface of the chamber 30. At this mating position there is provided a series of hydrostatic bearings 38, the sources and drains for which are not shown to simplify the illustration.

The interior portion of the piston 16b is contoured to provide an oval shaped interior chamber 44a which in conjunction with the lower end of the chamber 30 provides a lower spring cavity 44. Similarly, the area of the chamber 30 between the main oscillatory orifice 29 and portion 16b provides an upper spring cavity 46 which is coupled to a source of pressurized fluid (P). An air bleed line 49 is provided from the top of the lower spring cavity 44 through the interior of the portion 16b and opens into the discharge cavity 20 so that when the valve oscillates, entraped air may be vented.

In accordance with the invention there is provided a centering circuit 50 which includes a source of pressure ($P_1$) and a valve 51 formed in the member 16 at a position just above the cut away portion 28. The valve 51 includes a pair of grooves 54 and 56 separated by a land 58 with the upper groove 54 coupled to the pressure source $P_1$ and the lower groove connected to a drain line 59. A line 60 from the chamber 44 opens into a small annular cut away from the insert member 12, shown opposite to the land 58. In the illustrative position the land 58 blocks any communication between the cavity 44 and the grooves 54 and 56. The line 60 is either constricted or formed with a small diameter and so as to present an acoustic resistance which is largely compared to the stiffness reactance of the fluid in the cavities 44 and 46 at the oscillation frequency of the valve member 16. Thus the centering circuit is acoustically isolated from the acoustic system which includes the cavities 44 and 46 and the valve member 16.

More particularly, the role of the centering circuit is to control the position of the valve 16 during operation so that it oscillates about its equilibrium position (to wit, that position about which the member 16 may be considered to execute its oscillations normally defined by a line to line relationship between the metering edge of the valve and the corresponding edge of the stator port). Therefore during operation the cavity 44 will be coupled to the pressure source $P_1$ during only a portion of a cycle. However, if the load varies and the valve member 16 should tend to have its average position displaced downwardly, the groove 54 will be in communication with the cavity 44 for an increased portion of oscillation period and as a result the average pressure acting upon the piston portion 16b will be increased thereby tending to restore the valve member to its equilibrium position. Similarly, if the valve tends to be displaced upwardly the cavity 44 will be in communication with the pressure source $P_1$ for a shorter time interval and the average pressure in the cavity 44 will decrease, thereby causing the valve 16 to be displaced downwardly.

In operation as the valve member 16 displaces downwardly, the main orifice opens and pressurized fluid flows from the upper spring cavity 46 into the discharge chamber 20. On the other hand, as the valve is displaced upwardly, the flow is throttled and the orifice 29 is closed. Accordingly, during a certain portion of a cycle the upper spring cavity 46 will be in communication with the discharge cavity 20. Of course, at the upward center of the stroke, energy is stored principally in the upper spring cavity 46 and during the downward stroke, energy is stored in the lower spring cavity 44. A portion of the stored energy is transferred to the piston portion 16b of the valve member 16 during portions of the cycle, as the valve member 16 oscillates at the resonant frequency. The fluid stiffness presented by the cavities 44 and 46 and the mass of the valve piston member 16 determine the resonant frequency at which the member 12 executes its oscillatory motion.

Oscillator configurations in accordance with the invention are ideally suited for driving reactive or complex impedance loads inasmuch as it automatically adjusts its oscillator frequency with load variations to operate at the single-degree-of-freedom circuit resonance, thereby effecting effective maximum power transfer.

While a single embodiment of the invention has been described, variations thereof and modifications therein within the spirit of the invention will undoubtedly suggest themselves to those skilled in the art. Accordingly, the foregoing description should be taken as illustrative and not in any limiting sense.

What is claimed is:
1. An acoustic vibration generator for vibrating a load comprising
  (a) a housing defining an upper discharge cavity and a lower chamber separated by a stator port region,
  (b) a valve member in said housing, coupled to said load, extending through said stator port region into said chamber and terminating in a free end piston portion which separates said chamber into an upper cavity and a lower spring cavity,
  (c) said valve member including a cut away portion and being arranged so as to move in relation to said stator port between an open first position whereby communication is provided between said discharge cavity and said upper spring cavity and a fluid flow throttling second position,
  (d) a source of pressurized fluid in communication with said upper spring cavity, and
  (e) said upper and lower cavities and said valve member being configured to define an acoustic circuit for supporting self excited oscillatory movement of said valve between said positions.

2. The invention as set forth in claim 1 wherein said housing includes means for supporting said valve member constraining it to movement with a single degree of freedom.

3. The invention as set forth in claim 2 including centering means for establishing an equilibrium position about which said valve member oscillates.

4. The invention as set forth in claim 3 wherein said supporting means includes a cylindrical bearing surface for mating with said valve member, said centering means comprising
  (a) upper and lower grooves cut into said valve and spaced from each other by a land,
  (b) a second source of pressurized fluid and a drain both opening onto said bearing surface, and
  (c) a line communicating with said lower spring cavity and opening onto said bearing surface intermediate between said second pressure source and said drain so that in said equilibrium position second pressure source is coupled to said upper groove and said drain is coupled to said lower groove.

5. The invention as set forth in claim 1 wherein the end of said piston portion facing said lower cavity is contoured to provide an oval shaped chamber interior of said piston.

References Cited
UNITED STATES PATENTS

| | | | |
|---|---|---|---|
| 2,585,975 | 2/1952 | Terry | 91—235 |
| 2,729,941 | 1/1956 | Rose et al. | 91—50 |
| 3,057,331 | 10/1962 | Frantz | 91—235 |
| 3,376,790 | 4/1968 | Matson | 91—235 |

LOUIS J. CAPOZI, Primary Examiner

U.S. Cl. X.R.
91—390